(12) United States Patent
Kayser et al.

(10) Patent No.: US 11,761,849 B2
(45) Date of Patent: Sep. 19, 2023

(54) WIND TUNNEL FOR A MOTOR VEHICLE WITH OPTICAL VEHICLE CONFIGURATION DETERMINATION AND METHOD FOR OPERATING A WIND TUNNEL WITH OPTICAL VEHICLE CONFIGURATION DETERMINATION

(71) Applicant: Dr. Ing. h.c. F. Porsche Aktiengesellschaft, Stuttgart (DE)

(72) Inventors: Tim Kayser, Ingersheim (DE); Marcel Straub, Remseck (DE); Jan-Niklas Helbach, Asperg (DE); Matthias Braun, Ludwigsburg (DE); Jin Gong, Stuttgart (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 65 days.

(21) Appl. No.: 17/556,008

(22) Filed: Dec. 20, 2021

(65) Prior Publication Data
US 2022/0196516 A1 Jun. 23, 2022

(30) Foreign Application Priority Data
Dec. 21, 2020 (DE) ................... 10 2020 134 357.4

(51) Int. Cl.
*G01M 9/04* (2006.01)
*G01M 11/08* (2006.01)
(Continued)

(52) U.S. Cl.
CPC ............ *G01M 9/04* (2013.01); *G01M 11/081* (2013.01); *G01M 17/007* (2013.01); *G06V 10/44* (2022.01); *G06V 20/52* (2022.01)

(58) Field of Classification Search
CPC .................................................. G01M 11/081
See application file for complete search history.

(56) References Cited

U.S. PATENT DOCUMENTS

2012/0255350 A1* 10/2012 Nobles ................. G01M 9/067
73/147
2013/0298659 A1* 11/2013 Smith ..................... G01M 9/08
73/147

FOREIGN PATENT DOCUMENTS

DE 102011054434 A1 * 4/2013 ........ G01M 17/0074
DE 102011054434 A1 4/2013
WO WO-2020250178 A1 * 12/2020 .......... G01M 17/022

OTHER PUBLICATIONS

English translation of WO 2020250178 (Year: 2020).*
English translation of DE 102011054434 (Year: 2013).*

* cited by examiner

*Primary Examiner* — Eric S. McCall
*Assistant Examiner* — Timothy P Graves
(74) *Attorney, Agent, or Firm* — RatnerPrestia

(57) ABSTRACT

A wind tunnel for a motor vehicle, with a fan, a test section, through which an air stream generated by the fan can flow, a recording device for recording different motor vehicles within the test section, and a testing device for determining aerodynamic characteristics of the motor vehicle. The wind tunnel also includes an optical sensing device for sensing an outer contour of the motor vehicle recorded by the recording device, an evaluating unit and a linking unit. The evaluating unit determines a vehicle configuration from the outer contour of the motor vehicle sensed by the optical sensing device. The linking unit links the vehicle configuration of the motor vehicle determined by the evaluating unit with the test results determined by the testing device.

12 Claims, 1 Drawing Sheet

Figure 1:
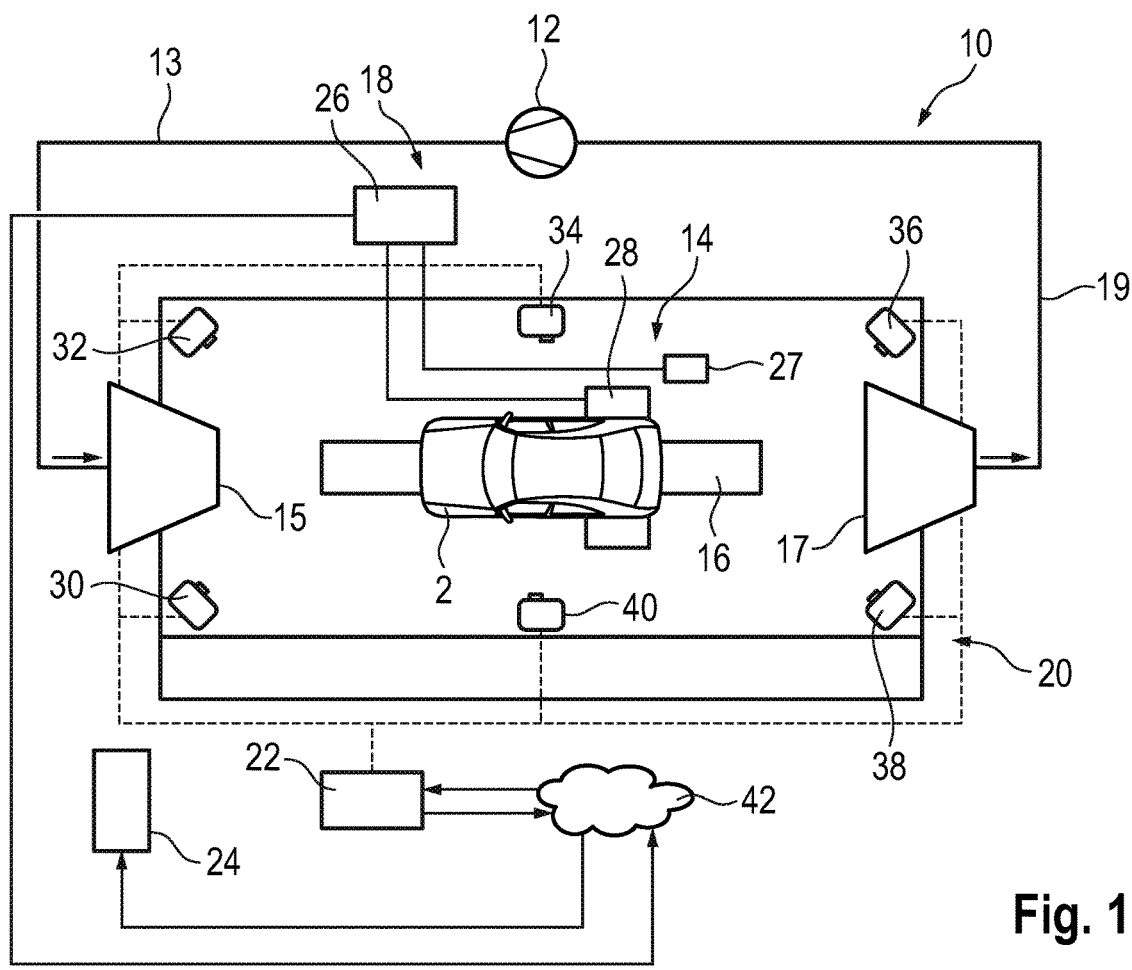

(51) Int. Cl.
  *G01M 17/007* (2006.01)
  *G06V 10/44* (2022.01)
  *G06V 20/52* (2022.01)

WIND TUNNEL FOR A MOTOR VEHICLE WITH OPTICAL VEHICLE CONFIGURATION DETERMINATION AND METHOD FOR OPERATING A WIND TUNNEL WITH OPTICAL VEHICLE CONFIGURATION DETERMINATION

CROSS-REFERENCE TO RELATED APPLICATION

This application claims priority to German Patent Application No.: 10 2020 134 357.4, filed Dec. 21, 2020, the content of such application being incorporated by reference herein in its entirety.

FIELD OF THE INVENTION

The invention relates to a wind tunnel for a motor vehicle, with a fan, a test section, through which an air stream generated by the fan can flow, a receiving device for receiving different motor vehicles within the test section, and a testing device for determining aerodynamic characteristics of the motor vehicle. The invention also relates to a method for operating a wind tunnel.

BACKGROUND OF THE INVENTION

Such wind tunnels are used in particular in motor vehicle development. This involves arranging a motor vehicle in a test section of the wind tunnel and using a fan to introduce into the test section an air stream that is as uniform as possible and unaffected by turbulence, which flows around the motor vehicle. During the testing in the wind tunnel, the air stream flows around the motor vehicle and among the effects it has, produces a vertical force on the motor vehicle, which is sensed by means of a testing device. In this case, the motor vehicle is for example arranged on a receiving device with a force measuring unit, the force measuring unit sensing the vertical force. The vertical force determined can be used for example to determine the negative lift of the motor vehicle, the negative lift on a drive axle of the motor vehicle being decisive for the cornering and the acceleration of the motor vehicle. Also determined during the testing is the wind speed in the test section. The results collected are used to determine the so-called drag coefficient, also known as the cw value. The smaller the cw value, the lower the aerodynamic drag of the motor vehicle and the lower the fuel consumption of the motor vehicle during a journey. Such a wind tunnel is disclosed for example by DE 10 2011 054 434 A1, which is incorporated by reference herein.

Before carrying out the actual wind tunnel testing, the motor vehicle to be investigated must be measured and the exact outer contour of the motor vehicle determined. This also forms part of the testing in the wind tunnel. The measurement and the determination of the outer contour are usually performed manually by a person carrying out the testing, the person determining the exact outer contour by hand. Furthermore, the various vehicle configurations must be determined manually by the person and entered into a test report by hand. The vehicle configuration is understood as comprising various designs of a motor vehicle, a motor vehicle being able to have for example different air-deflecting elements, different positions of the air-deflecting elements present or different ride heights.

A disadvantage of such a procedure is that the manual determination of the outer contour of the motor vehicle, the manual determination of the motor vehicle configuration and the manual entering of the data determined are very time-consuming and, as a result, testing in the wind tunnel takes a considerable amount of time.

SUMMARY OF THE INVENTION

A wind tunnel includes a testing device with which testing, which also includes the measuring and sensing of the outer contour, can be carried out in a reduced amount of time.

The amount of time required for testing in the wind tunnel can be reduced considerably by providing an optical sensing device for sensing an outer contour of the motor vehicle, an evaluating unit and a linking unit, the evaluating unit being designed in such a way that the evaluating unit determines a vehicle configuration from the outer contour of the motor vehicle sensed by the optical sensing device, and the linking unit being designed in such a way that the linking unit links the vehicle configuration of the motor vehicle determined by the evaluating unit with the test results determined by the testing device. In this case, the outer contour of the motor vehicle is sensed exactly and with a high level of detail by means of the optical sensing device and transmitted to the evaluating unit. The evaluating unit determines the outer contour of the motor vehicle and uses it to determine a motor vehicle configuration. The motor vehicle configuration includes all components and settings that influence the flow of air around the motor vehicle, and consequently its aerodynamics. It includes for example the various air-deflecting elements, in the case of adjustable air-deflecting elements the existing position of the air-deflecting elements or the distance between the underfloor of the motor vehicle and the roadway. The motor vehicle configuration also includes for example the vehicle wheels, in particular the wheel rims of the motor vehicle, since the vehicle wheels also influence the flow of air around the motor vehicle due to turbulence occurring at the vehicle wheels. The motor vehicle configuration determined by the evaluating unit is linked by a linking unit with the test results of the associated testing, so that a test record with the motor vehicle configuration and the associated test results is created in an automated manner.

The amount of time required for the testing can be reduced by the automated sensing and the automated linking of the motor vehicle configuration with the associated test results. Furthermore, errors due to vehicle data being incorrectly entered by the person carrying out the testing can be avoided. Furthermore, errors of incorrect assignment between vehicle data and test results are reliably prevented.

Preferably, the optical sensing device has at least one camera, whereby the outer contour can be sensed reliably and with high resolution, so that all the fine details of the outer contour of the motor vehicle can be sensed.

In a preferred design, the optical sensing device has six cameras, which are arranged evenly distributed around the motor vehicle. This allows the entire outer contour to be reliably sensed. In this case, multiple recordings by the individual cameras are carried out with varying degrees of detail and the camera recordings are subsequently processed in an automated manner to obtain an outer contour of the motor vehicle.

Preferably, a data memory interacting with the evaluating unit is provided, having various predefined vehicle configurations, the evaluating unit determining on the basis of the sensed outer contour of the motor vehicle a predefined vehicle configuration stored in the data memory. The data memory comprises various stored vehicle configurations, which are defined for example by the vehicle model, by specific vehicle features or by specific driving conditions. The evaluating unit compares the sensed outer contour with the vehicle configuration stored in the data memory and deduces from the comparison the vehicle model, the vehicle features, for example specific spoiler elements, and the driving conditions of the motor vehicle. This allows for example various test records for a single vehicle model obtained on the basis of the motor vehicle configuration and the test results to be easily combined to form a test series for this vehicle model.

In a preferred design, the data memory is a cloud-based data memory. The cloud-based data memory makes easy, wireless communication between the evaluating unit and the data memory possible. The cloud-based data memory makes bidirectional communication between the data memory and the evaluating unit easily possible. For comparing the sensed outer contour of the motor vehicle with the vehicle configuration stored in the data memory, the evaluating unit can call up the data required for this from the data memory. Furthermore, the evaluating unit can transmit the determined vehicle configurations to the data memory, and these are stored in the data memory. The fact that the test results of the testing device are also stored in the data memory means that the linking unit can call up the test results and the vehicle configurations from the data memory in order to link them with one another.

Described herein is a method for the partially automated operation of a wind tunnel. Firstly, the outer contour of the motor vehicle is sensed by the optical sensing device, the sensed outer contour of the motor vehicle being processed by the evaluating unit, evaluated and a motor vehicle configuration determined. Subsequently, testing is carried out and the test results are sensed by the testing device.

Finally, the determined vehicle configuration is linked with the determined test results. For the advantages of the method, reference is made to the previous paragraphs.

Such a wind tunnel and such a partially automated method for operating the wind tunnel allow the amount of time required for testing in the wind tunnel to be reduced and errors due to vehicle data being incorrectly entered by the person carrying out the testing to be avoided.

BRIEF DESCRIPTION OF THE DRAWING FIGURES

An exemplary embodiment of the invention is explained in more detail on the basis of the drawings.

FIG. 1 schematically shows a wind tunnel, and

Figure 2:
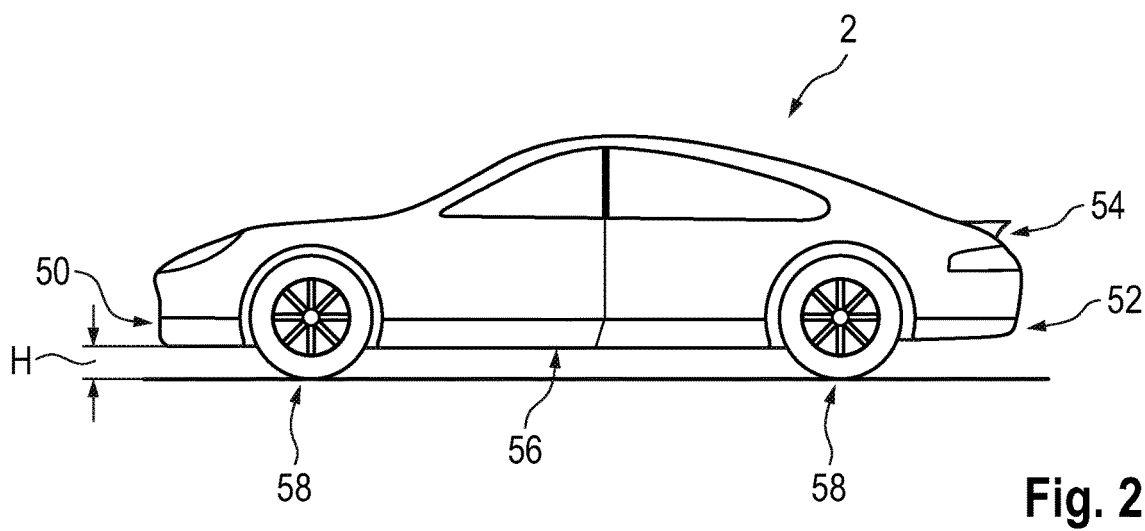

FIG. 2 shows a motor vehicle to be tested in the wind tunnel of FIG. 1.

DETAILED DESCRIPTION OF THE INVENTION

FIG. 1 shows a wind tunnel 10 for the aerodynamic investigation of a motor vehicle 2 that is shown in FIG. 2 or a model of the motor vehicle 2. The wind tunnel 10 is formed for example as a so-called closed return-flow wind tunnel. An air stream is generated by means of a fan device 12 and is fed by means of an air-feeding device 13 to a wind tunnel contraction 15 of the wind tunnel 10. The wind tunnel contraction 15 accelerates the air stream and directs it to a test section 14, in which the motor vehicle 1 is arranged. For receiving the motor vehicle 2, a receiving device 16, which has four wheel-receiving units that are not shown in FIG. 1, is provided in the test section 14. A collector 17 is arranged downstream of the test section 14. The collector 17 feeds the air stream flowing out of the wind tunnel contraction 15 back to the fan device 12 by means of an air evacuation device 19.

Furthermore, the wind tunnel 10 comprises a testing device 18, which includes a control unit 26, a sensor 27 for sensing the flow velocity and a testing unit 28 (e.g., computer processor) for determining the forces acting on the motor vehicle 2, in particular negative lift forces.

For assessing the aerodynamic properties of the motor vehicle 2, before the actual testing, the outer contour of the motor vehicle 2 must be determined. This is required in order to be able to establish a relationship between the test values of the testing device 18 and the components of the motor vehicle 2 that change the aerodynamics. Usually, the sensing of the outer contour of the motor vehicle 2 and the assignment of the sensed outer contour of the motor vehicle 2 to the test values of the testing device 18 are performed manually by a person carrying out the testing. This process is time-consuming and prone to errors.

According to aspects of the invention, the wind tunnel 10 comprises an optical sensing device 20, an evaluating unit 22 (e.g., computer processor) and a linking unit 24 (e.g., computer processor).

The optical sensing device 20 has six cameras 30, 32, 34, 36, 38, 40, which are arranged in the region of the test section 14. The cameras 30, 32, 34, 36, 38, 40 are arranged distributed around the motor vehicle 2 in such a way that the outer contour of the motor vehicle 2 is completely sensed. The cameras 30, 32, 34, 36, 38, 40 are connected in signaling terms to the evaluating unit 22, the images that are sensed by the cameras 30, 32, 34, 36, 38, 40 being transmitted to the evaluating unit 22 and evaluated in the evaluating unit 22.

The evaluating unit 22 creates an outer contour of the motor vehicle 2 from the images of the cameras 30, 32, 34, 36, 38, 40. Subsequently, the evaluating unit 22 determines a motor vehicle configuration. This involves the determined outer contour of the motor vehicle 2 being compared with a multiplicity of motor vehicle configurations stored in a cloud-based database 42 and the motor vehicle configuration that matches the outer contour of the motor vehicle 2 being determined. The motor vehicle configuration includes all of the components and settings that influence the flow of air around the vehicle, and consequently its aerodynamics. These include for example an adjustable rear spoiler 54, shown in FIG. 2, with its current position, a side sill 56, the ride height H of the motor vehicle 2 and/or the design of the vehicle wheels 58. The vehicle configuration also includes various air intakes and air-diverting components that are present on the outer contour.

The wind tunnel 10 also comprises a linking unit 24, which is connected on the one hand to the testing device 18 and on the other hand to the evaluating unit 22. The linking unit 24 receives from the evaluating unit 22 the determined motor vehicle configuration of the motor vehicle 2 that is arranged in the wind tunnel 10 and is to be investigated. Furthermore, the linking unit 24 receives the test results of the testing device 18. In an automated manner, the linking unit 24 links the determined motor vehicle configuration with the associated test results of the testing device 18 and creates a test record of the wind tunnel testing with all of the relevant characteristics, i.e. the test values and the motor vehicle configuration.

The linking unit 24 and the testing device 18 are likewise connected to the database 42, the connection between the evaluating unit 22, the testing device 18 and the linking unit 24 taking place by way of the database 42. Here, the database 42 is connected bidirectionally to the evaluating unit 22, so that the evaluating unit 22 can on the one hand call up data to determine the vehicle configuration on the basis of the determined outer contour of the motor vehicle 2 and on the other hand transmit data, in particular the determined motor vehicle configuration, to the database 42. The testing device 18 transmits the test results to the database 42, in which the test results are stored. The linking unit 24 calls up the stored test results of the testing device and the associated motor vehicle configuration of the motor vehicle 2 arranged in the wind tunnel 10 from the database 42, links them to one another and creates a test record.

The amount of time required for testing in the wind tunnel can be reduced and errors caused by incorrect sensing of the outer contour can be avoided by such a design of the wind tunnel 10, with the optical sensing device 20, the evaluating unit 22, the testing device 18 and the linking unit 24 forming a closed system which couples the characteristics of the motor vehicle, i.e. the motor vehicle configuration, and the associated test results to one another in an automated manner.

Other structural embodiments than the embodiments described are also possible and come within the scope of protection. For example, the optical sensing device 20 or the receiving device 16 may be designed differently.

The units described herein may either individually or collectively comprise one or more computer processors, for example.

What is claimed:

1. A wind tunnel for a motor vehicle, said wind tunnel comprising:
    a fan,
    a test section, through which an air stream generated by the fan can flow,
    a testing device for determining aerodynamic characteristics of the motor vehicle positioned within the test section,
    an optical sensing device configured for sensing an outer contour of the motor vehicle,
    an evaluating unit configured for determining a vehicle configuration from the outer contour of the motor vehicle sensed by the optical sensing device, and
    a linking unit configured for linking the vehicle configuration of the motor vehicle determined by the evaluating unit with test results determined by the testing device.

2. The wind tunnel as claimed in claim 1, wherein the optical sensing device has at least one camera.

3. The wind tunnel as claimed in claim 1, wherein the optical sensing device has six cameras, which are evenly distributed around the motor vehicle.

4. The wind tunnel as claimed in claim 1, further comprising a data memory having various predefined vehicle configurations and being configured for interacting with the evaluating unit, the evaluating unit being configured to identify, on the basis of the sensed outer contour of the motor vehicle, one of the predefined vehicle configurations stored in the data memory.

5. The wind tunnel as claimed in claim 4, wherein the data memory is a cloud-based data memory.

6. A method for partially automated operation of a wind tunnel, said method comprising the steps of:
    sensing an outer contour of a motor vehicle using an optical sensing device,
    processing and evaluating the sensed outer contour of the motor vehicle using an evaluating unit,
    determining a motor vehicle configuration using the evaluating unit,
    testing and sensing test results using a testing device, and
    linking the determined motor vehicle configuration with the test results using a linking unit.

7. The method as claimed in claim 6, wherein the optical sensing device has at least one camera.

8. The method as claimed in claim 6, wherein the optical sensing device has six cameras, which are evenly distributed around the motor vehicle.

9. The method as claimed in claim 6, further comprising a data memory having various predefined vehicle configurations and being configured for interacting with the evaluating unit, the evaluating unit being configured to identify, on the basis of the sensed outer contour of the motor vehicle, one of the predefined vehicle configurations stored in the data memory.

10. The method as claimed in claim 9, wherein the data memory is a cloud-based data memory.

11. The wind tunnel as claimed in claim 1, wherein the testing device includes a force measuring unit for sensing a vertical force applied to the vehicle by the fan, and a processor for determining a negative lift force of the vehicle based on the sensed vertical force.

12. The method as claimed in claim 6, wherein the testing device includes a force measuring unit for sensing a vertical force applied to the vehicle by a fan of the wind tunnel, and a processor for determining a negative lift force of the vehicle based on the sensed vertical force.

* * * * *